(12) United States Patent
Zhao

(10) Patent No.: US 12,404,938 B2
(45) Date of Patent: Sep. 2, 2025

(54) EXTENDED SEAT FOR A GATE VALVE

(71) Applicant: Severe Service Valve Inc., Houston, TX (US)

(72) Inventor: Peng Stephen Zhao, Houston, TX (US)

(*) Notice: Subject to any disclaimer, the term of this patent is extended or adjusted under 35 U.S.C. 154(b) by 6 days.

(21) Appl. No.: 18/436,813

(22) Filed: Feb. 8, 2024

(65) Prior Publication Data
US 2025/0257807 A1    Aug. 14, 2025

(51) Int. Cl.
 *F16K 3/20* (2006.01)
 *F16K 3/02* (2006.01)
 *F16K 27/04* (2006.01)

(52) U.S. Cl.
 CPC .............. *F16K 3/20* (2013.01); *F16K 3/0227* (2013.01); *F16K 27/044* (2013.01)

(58) Field of Classification Search
 CPC ......... F16K 3/20; F16K 3/0227; F16K 27/044
 USPC .................................................. 251/326–329
 See application file for complete search history.

(56) References Cited

U.S. PATENT DOCUMENTS

| | | | |
|---|---|---|---|
| 3,353,786 A * | 11/1967 | Combes ................ | F16K 27/044 251/329 |
| 3,463,447 A * | 8/1969 | Ripert ..................... | F16K 3/16 251/328 |
| 3,696,831 A * | 10/1972 | Fowler .................... | F16K 3/36 251/327 |
| 4,878,651 A * | 11/1989 | Meyer, Jr. ............. | F16K 3/0236 251/328 |
| 8,973,897 B2 * | 3/2015 | Cordova ................. | F16K 3/02 251/327 |
| 10,508,744 B2 * | 12/2019 | Roberts ................. | F16K 3/0236 |
| 11,435,001 B2 | 9/2022 | Kalimuthu | |
| 2008/0217569 A1 * | 9/2008 | Holliday ................ | F16K 31/50 137/13 |
| 2014/0054487 A1 * | 2/2014 | Namous ................ | F16K 31/508 251/326 |

* cited by examiner

*Primary Examiner* — John Bastianelli
(74) *Attorney, Agent, or Firm* — Jeffrey L. Streets

(57) ABSTRACT

A gate valve for controlling the flow of fluid media through a fluid passageway includes a gate positioned between two seats within a valve chamber. The gate includes a gate opening and a sealing surface. The first and second seats each include a seat opening and a sealing surface. The gate may be in an open position where the gate opening is aligned with the seat openings or a closed position where the sealing surface of the gate is aligned with the seat openings to close off the fluid passageway and the gate opening is aligned with the sealing surfaces of the seats to close off both sides of the gate opening. The seats are configured to prevent any of the fluid media from leaking into the valve chamber when the gate is moved between the open and closed positions.

20 Claims, 13 Drawing Sheets

EXTENDED SEAT FOR A GATE VALVE

BACKGROUND

The present disclosure relates to valve assemblies and, more particularly, to an improved gate valve assembly.

BACKGROUND OF THE RELATED ART

A gate valve is a device that opens by moving a barrier or gate out of a fluid passageway that extends through the valve. Gate valves are used to shut off the flow of fluids, typically liquids, rather than for flow regulation. When fully open, the typical gate valve has no obstruction in the fluid passageway, which leads to very low flow resistance.

BRIEF SUMMARY

Some embodiments provide a gate valve comprising a valve body forming a valve chamber within the valve body and forming a fluid passageway that extends through the valve body and transversely intersecting the valve chamber. The valve chamber includes a first circumferential seat pocket around the fluid passageway facing into the valve chamber in a first direction and a second circumferential seat pocket around the fluid passageway facing into the valve chamber in a second direction opposite the first direction. The gate valve further comprises a first body bushing having a first end received in the first circumferential seat pocket, a second end extending in the first direction into the valve chamber, and an opening through the first body bushing that aligns with the fluid passageway, as well as a second body bushing having a first end received in the second circumferential seat pocket and a second end extending in the second direction into the valve chamber, and an opening through the second body bushing that aligns with the fluid passageway. Still further, the gate valve comprises a first seat having first and second ends, first and second opposing sides extending between the first and second ends of the first seat, a first seat opening that extends through a first region of the first seat, a first sealing surface formed by a second region of the first seat, and a circumferential recess around the first seat opening on the second side of the first seat, wherein the second end of the first body bushing is received in the circumferential recess around the first seat opening to align the first seat opening with the fluid passageway, and wherein the first side of the first seat is flat. The gate valve also comprises a second seat having first and second ends, first and second opposing sides extending between the first and second ends of the second seat, a second seat opening that extends through a first region of the second seat, a second sealing surface formed by a second region of the second seat, and a circumferential recess around the second seat opening on the second side of the second seat, wherein the second end of the second body bushing is received in the circumferential recess around the second seat opening to align the second seat opening with the fluid passageway, and wherein the first side of the second seat is flat. In addition, the gate valve comprises a gate having first and second ends, first and second opposing flat sides extending from the first end to the second end, a gate opening that extends through a first region of the gate, and a sealing surface of the gate formed by a second region of the gate. The first flat side of the gate slidingly engages the first flat side of the first seat and the second flat side of the gate slidingly engages the first flat side of the second seat. Furthermore, the gate is axially moveable within the valve chamber between an open position where the gate opening is aligned with the first and second seat openings and a closed position where the sealing surface of the gate is aligned with the first and second seat openings to close off the fluid passageway and the gate opening is aligned with the first sealing surface of the first seat and the second sealing surface of the second seat to close off both sides of the gate opening.

DETAILED DESCRIPTION

Figure 1:
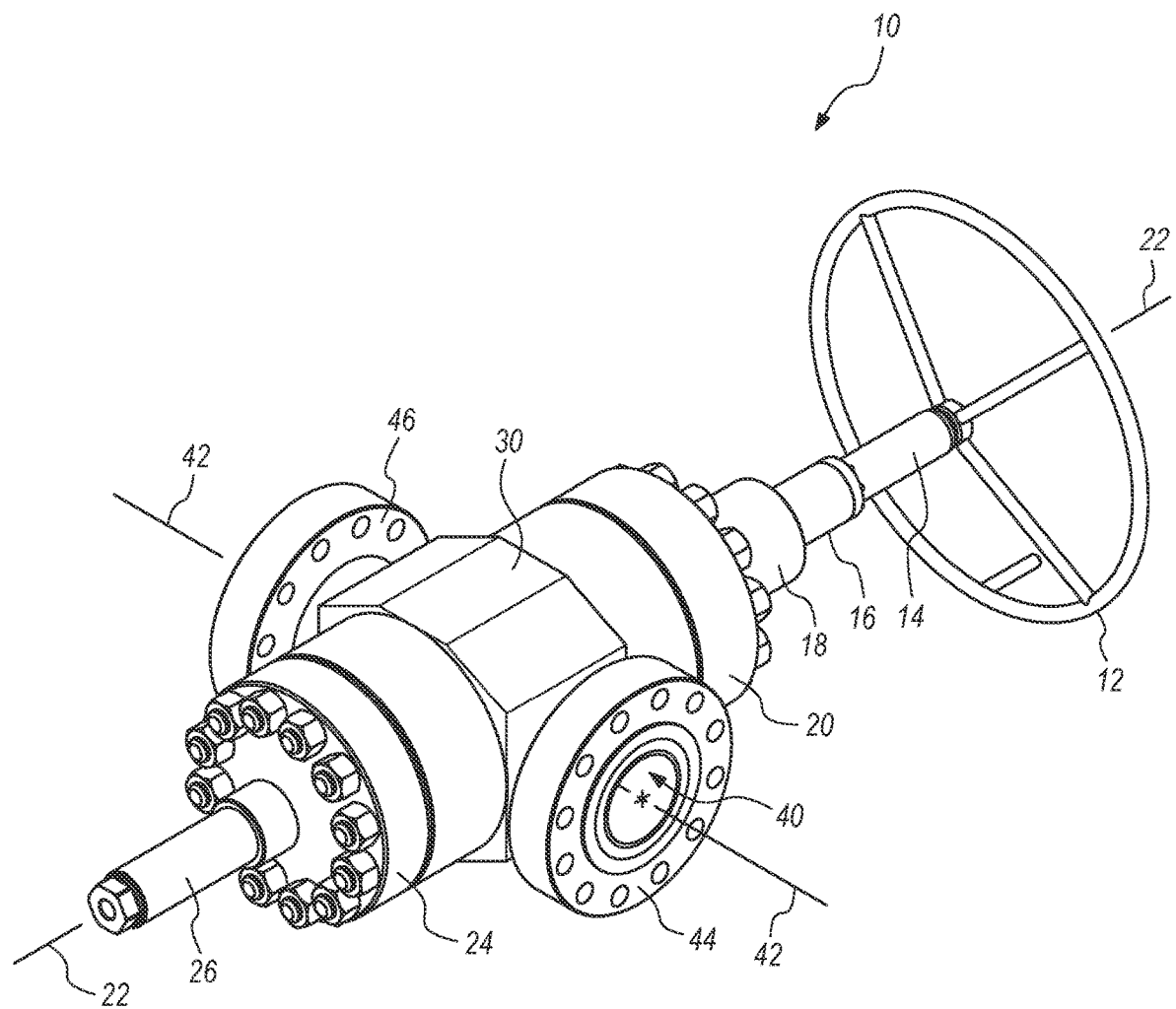
FIG. 1 is a perspective view of a gate valve.

Some embodiments provide a gate valve comprising a valve body forming a valve chamber within the valve body and forming a fluid passageway that extends through the valve body and transversely intersecting the valve chamber. The valve chamber includes a first circumferential seat pocket around the fluid passageway facing into the valve chamber in a first direction and a second circumferential seat pocket around the fluid passageway facing into the valve chamber in a second direction opposite the first direction. The gate valve further comprises a first body bushing having a first end received in the first circumferential seat pocket, a second end extending in the first direction into the valve chamber, and an opening through the first body bushing that aligns with the fluid passageway, as well as a second body bushing having a first end received in the second circumferential seat pocket and a second end extending in the second direction into the valve chamber, and an opening through the second body bushing that aligns with the fluid passageway. Still further, the gate valve comprises a first seat having first and second ends, first and second opposing sides extending between the first and second ends of the first seat, a first seat opening that extends through a first region of the first seat, a first sealing surface formed by a second region of the first seat, and a circumferential recess around the first seat opening on the second side of the first seat, wherein the second end of the first body bushing is received in the circumferential recess around the first seat opening to align the first seat opening with the fluid passageway, and wherein the first side of the first seat is flat. The gate valve also comprises a second seat having first and second ends, first and second opposing sides extending between the first and second ends of the second seat, a second seat opening that extends through a first region of the second seat, a second sealing surface formed by a second region of the second seat, and a circumferential recess around the second seat opening on the second side of the second seat, wherein the second end of the second body bushing is received in the circumferential recess around the second seat opening to align the second seat opening with the fluid passageway, and wherein the first side of the second seat is flat. In addition, the gate valve comprises a gate having first and second ends, first and second opposing flat sides extending from the first end to the second end, a gate opening that extends through a first region of the gate, and a sealing surface of the gate formed by a second region of the gate. The first flat side of the gate slidingly engages the first flat side of the first seat and the second flat side of the gate slidingly engages the first flat side of the second seat. Furthermore, the gate is axially moveable within the valve chamber between an open position where the gate opening is aligned with the first and second seat openings and a closed position where the sealing surface of the gate is aligned with the first and second seat openings to close off the fluid passageway and the gate opening is aligned with the first sealing surface of the first seat and the second sealing surface of the second seat to close off both sides of the gate opening.

The valve body is typically a solid piece of metal that has been cast, machined and/or welded to form the fluid passageway and the valve chamber. The fluid passageway through the valve body may terminate at a pair of flanges that accommodate bolts and seals for connecting to flanged pipes and/or other equipment. The valve chamber intersects the fluid passageway to control flow through the fluid passageway, such as permitting full fluid flow in the open position or condition or blocking flow in the closed position or condition. In some embodiments, the fluid passageway may be cylindrical about a first central axis, the valve chamber may be cylindrical or have a cylindrical portion about a second central axis, and the first central axis may be perpendicular to the second central axis. The fluid passageway may have a cross-sectional dimension that is described as a radius or diameter and the gate opening, seat openings and bushing openings preferably have the same or nearly the same radius or diameter as the fluid passageway. In order to selectively block the flow in the fluid passageway, the valve chamber preferably has a greater lateral dimension that the fluid passageway such as the valve chamber having a greater diameter than the fluid passageway.

In some embodiments, the valve body may be made with a carbon steel, low alloy steels, stainless steels or a wide variety of corrosion resistant alloys. The selection of a material for constructing the valve body may be based on the conditions of the fluid that may flow within and through the gate valve. For example, in oil and gas production operations, a gate valve may control flow of a fluid that contains a variety of one or more compounds. Non-limiting examples of such compounds may include liquid and gaseous hydrocarbon compounds, water, mud compositions, formation fracturing fluids (including proppants such as sand), and various gases such as hydrogen sulfide ($H_2S$) and carbon dioxide ($CO_2$). Furthermore, the fluid that may flow within and through the gate valve may have an elevated pressure, such as 10,000-20,000 pounds per square inch (PSI), at various temperatures, such as −46 degrees Celsius (° C.) to about 121° C. Depending upon an anticipated fluid flow rate, the fluid passageway through the gate valve may have a corresponding diameter, such as a nominal diameter from 5 to 9 inches. Furthermore, the valve body or other components of the gate valve may be treated to improve the physical properties of the materials, such as a tungsten carbide coating on the sealing surfaces that will extend the sealing life or optional antifriction coatings. For example, a preferred seat may be made with hard faced 410 stainless steel, which may be hard faced by STL6 weld overlay or more preferably by tungsten carbide coating via high velocity oxygen fuel. For a gate valve having a 7 inch diameter fluid passageway, the seat may be about 2 inches thick, but may be scaled down for smaller diameter valves.

In some embodiments, the first seat may be identical to the second seat. In other words, the first and second seats may be interchangeable. Similarly, the first body bushing may be identical to the second body bushing, such that the first and second body bushings are interchangeable. It should be understood that the use of the terms "first" and "second" are used to distinguish between a pair of something and does not imply an order of importance, order of installation, or order of use. Furthermore, the terms "first" and "second" may be used to distinguish between components or features of a component without resorting to terms such as "left" and "right" or "upper" and "lower" that are specific to a particular orientation of the gate valve and/or a particular viewpoint of a person observing the gate valve, and without resorting to terms such as "upstream" or "downstream" that are specific to a particular installation or use of the gate valve.

The term "body bushing" is used herein to refer to a generally cylindrical member that is adapted to form a seal at both circular ends. The opening through the body bushing aligns with the fluid passageway and will convey fluid when the gate is in the open position. A body bushing may serve as an intermediary or adapter between one of the circumferential seat pockets and a seat opening in one of the seats. The body bushing may be in contact with both a circumferential seat pocket and a seat (i.e., a rim around the seat opening in one of the seats). Optionally, there may be physical pressure pushing the body bushing toward the circumferential seat pocket and the seat against the body bushing, but tight dimensional tolerances and/or the use of seal rings may provide a sufficiently tight and/or sealed engagement without additional physical pressure therebetween. The seal rings, as well as other sealing structures such as a stem seal packing, may be flexible pre-energized structures that provide a reliable seal for valves that have large dimensions and are operated to control high pressure fluids.

In some embodiments, the first flat side of the first seat has no grooves, interfaces or gaps between the first region and the second region that would allow a fluid within the gate opening to escape into the valve chamber as the gate opening is axially moved between the open and closed positions. Rather, the gate slides between the first flat side of the first seat and the first flat side of the second seat such that the gate opening makes a smooth and continuous transition between the open position where the gate opening (in the first region of the gate) is aligned with the seat openings (in the first regions of the seats) and the closed position where the gate opening is aligned with the sealing surfaces of the seats (in the second regions of the seats) and sealing surfaces of the gate (in the second region of the gate) are aligned with the seat openings. The gate valve may be characterized in that the closed position of the gate prevents the fluid from flowing through the fluid passageway and retains fluid within the gate opening between the seats. It is a technical benefit that the gate valve is operable without requiring periodic grease injections into the valve chamber.

In some embodiments, the first region of the gate (including the gate opening) is closer to a valve stem than the second region of the gate (including the sealing surfaces), the first region of the first seat (including the first seat opening) is more distant from the valve stem than the second region of the first seat (including the sealing surface), and the first region of the second seat (including the second seat opening) is more distant from the valve stem than the second region of the second seat (including the sealing surface). According to this embodiment, the gate is lowered (relative to the valve stem) to the open position and the gate is raised (relative to the valve stem) to the closed position. In alternative embodiments, the first region of the gate (including the gate opening) is more distant from the valve stem than the second region of the gate (including the scaling surfaces), the first region of the first seat (including the first seat opening) is closer to the valve stem than the second region of the first seat (including the sealing surface), and the first region of the second seat (including the second seat opening) is closer to the valve stem than the second region of the second seat (including the sealing surface). According to this alternative embodiment, the gate is raised (relative to the valve stem) to the open position and the gate is lowered (relative to the valve stem) to the closed position.

In some embodiments, the first seat may have first and second lateral edges that engage an interior wall of the valve chamber, and the second seat may have first and second lateral edges that engage the interior wall of the valve chamber. This engagement with the interior wall provides physical support for the seats, preventing or limiting movement of the seats both laterally in the plan of the seats and away from the gate.

In some embodiments, the interior wall of the valve chamber may be cylindrical about a central axis and may have a first radius of curvature. The first and second lateral edges of the first and second seats may have a second radius of curvature that is up to ¼ inch less than the first radius of curvature. Both the first and second radius of curvature are measured from the same axial centerline of the valve chamber so that when the seats are installed in the valve chamber, any gap between the lateral edges of the seats and the interior wall of the valve chamber will be a substantially uniform gap and the lateral edges will not present any sharp edges that could damage the interior wall during installation of the seats or during operation of the gate valve. Optionally, the first and second lateral edges may directly engage the interior wall of the valve chamber.

In some embodiments, a groove is provided within the first and second lateral edges of the first and second seats. These lateral edges are directed toward and proximate to the interior walls of the valve chamber. An elastomeric cord is disposed in each of the grooves, wherein the elastomeric cord engages the interior wall of the valve chamber and pushes or biases the first and second seats against the gate. Accordingly, the elastomeric cord may serve as a passive spring-like member that helps maintain full face-to-face contact between the second regions of the seats and the first region of the gate when the gate is in the closed position.

In some embodiments, a first circumferential rim may be provided around the first seat opening on the second side of the first seat. At least a portion of the first circumferential rim may extend into the first circumferential seat pocket around the fluid passageway. Similarly, a second circumferential rim may be provided around the second seat opening on the second side of the second seat. At least a portion of the second circumferential rim may extend into the second circumferential seat pocket around the fluid passageway.

In some embodiments, the gate valve may further comprise a first circumferential groove formed in the circumferential recess around the first seat opening and a first seal ring disposed in the first circumferential groove, wherein the first seal ring engages and seals with the second end of the first body bushing. Similarly, the gate valve may further comprise a second circumferential groove formed in a circumferential recess around the second end of the first body bushing and a second seal ring disposed in the second circumferential groove, wherein the second seal ring engages and seals with the first circumferential rim around the first seat opening. In a preferred configuration, the first circumferential groove and the first seal ring each have a first diameter and the second circumferential groove and the second seal ring each have a second diameter that is greater than the first diameter. The seal rings are provided to reduce or eliminate any of the fluid within the fluid passageway from escaping into the valve chamber through the interface between the seat(s) and the body bushing(s).

In some embodiments, the gate valve may further comprise third and fourth circumferential grooves formed in the first end of the first body bushing, a third seal ring disposed in the third circumferential groove and a fourth seal ring disposed in the fourth circumferential groove. The third and fourth seal rings engage and seal with the first circumferential seat pocket around the fluid passageway to reduce or eliminate any of the fluid within the fluid passageway from escaping into the valve chamber through the interface between the body bushing(s) and the valve body. In a preferred configuration, the third circumferential groove and the third seal ring each have a third diameter and the fourth circumferential groove and the fourth seal ring each have a fourth diameter that is greater than the third diameter. In one option, the first diameter of the groove and seal ring may be the same as the third diameter of the groove and seal ring, and the second diameter of the groove and seal ring may be the same as the fourth diameter of the groove and seal ring.

In some embodiments, the gate valve may further comprise a first bonnet secured to the valve body in axial alignment with the valve chamber, a valve stem having a first end coupled to the first end of the gate and axially extending through the first bonnet to a second end of the valve stem, and an actuator coupled to the second end of the valve stem for moving the gate between the open and closed positions. The actuator may be manually operable, such as a hand wheel, or automated, such as a hydraulic actuator. The valve stem may include a section with screw threads, wherein the first bonnet includes a ball screw nut engaged with the screw threads. The ball screw nut includes a plurality of ball bearings that glide through the screw threads of the valve stem and the tracks in the ball screw nut to reduce frictional forces during actuation of the valve stem. Rotation of the valve stem with screw threads engaged with the ball screw nut that is secured to the first bonnet cause the valve stem to move axially. Since the valve stem is directly or indirectly coupled to the gate, axial movement of the valve stem in a first direction causes the gate to move to the open position and axial movement of the valve stem in a second direction causes the gate to move to the closed position.

In some embodiments, the gate valve may further comprise a second bonnet secured the valve body in axial alignment with the valve chamber, wherein the second bonnet is secured on an opposite side of the valve chamber from the first bonnet. Accordingly, the gate valve may also comprise a balancing stem having a first end coupled to the second end of the gate and axially extending into the second bonnet to a second end of the balancing stem. In a preferred configuration, a valve stem bearing may be disposed in the first bonnet and around the valve stem for supporting axial movement of the valve stem and a balancing stem bearing may be disposed in the second bonnet and around the balancing stem for supporting axial movement of the balancing stem. The balancing rod and a surrounding end structure may reduce the amount of valve torque required to actuate the gate between open and closed positions and may further include an indication whether the valve is in the open or closed position.

The gate valve may have a fluid passageway with any suitable diameter, including fluid passageways with a nominal diameter from 5 inches to 9 inches.

Some embodiments may include one or more threaded blind holes in the first seat, such as in the second end of the first seat, for temporary connection to a first tool for positioning the first seat into the valve chamber during assembly of the gate valve. Similarly, one or more threaded blind holes may be included in the second seat, such as in the second end of the second seat, for temporary connection to a second tool for positioning the second seat into the valve chamber during assembly of the gate valve. The tool may be a simple rod or handle that extends beyond the seat for a person to maintain a grasp on the tool and easily guide the seat into position for engagement with a body bushing. Once the seat is installed, perhaps even after the gate is positioned between the first and second seats, the tool(s) may be disconnected from the seat(s)

Some embodiments provide a kit for modifying a gate valve. The gate valve includes a valve body that forms a valve chamber within the valve body and forms a fluid passageway that extends through the valve body and transversely intersects the valve chamber. Furthermore, the valve chamber includes a first circumferential seat pocket around the fluid passageway facing into the valve chamber in a first direction and a second circumferential seat pocket around the fluid passageway facing into the valve chamber in a second direction opposite the first direction. The kit comprises first and second body bushings and first and second seats according to one or more of the embodiments described herein. The kit may further comprise a gate and/or seal rings according to one or more of the embodiments described herein. Still further, the kit may comprise one or more tools for facilitating the installation of the seats into the valve chamber. The kit of components may be available in various nominal sizes to be used in an existing gate valve having a particular nominal size without requiring any modification of the valve body.

In some embodiments of the kit, the first body bushing may have a first end that is receivable in the first circumferential seat pocket, a second end that extends in the first direction into the valve chamber when the first end of the first body bushing is received into the first circumferential seat pocket, and an opening through the first body bushing that aligns with the fluid passageway when the first end of the first body bushing is received into the first circumferential seat pocket. Similarly, the second body bushing may have a first end that is receivable in the second circumferential seat pocket, a second end that extends in the second direction into the valve chamber when the first end of the second body bushing is received into the second circumferential seat pocket, and an opening through the second body bushing that aligns with the fluid passageway when the first end of the second body bushing is received into the first circumferential seat pocket.

In some embodiments of the kit, the first seat may have first and second ends, first and second opposing sides extending between the first and second ends of the first seat, a first opening that extends through a first region of the first seat, a first sealing surface formed by a second region of the first seat, and a circumferential recess around the first seat opening on the second side of the first seat. Accordingly, the second end of the first body bushing is receivable in the circumferential recess around the first seat opening to align the first seat opening with the fluid passageway when the second end of the first body bushing is received into the circumferential recess around the first seat opening, and wherein the first side of the first seat is flat. Similarly, the second seat may have first and second ends, first and second opposing sides extending between the first and second ends of the second seat, a second seat opening that extends through a first region of the second seat, a second sealing surface formed by a second region of the second seat, and a circumferential recess around the second seat opening on the second side of the second seat. Accordingly, the second end of the second body bushing is receivable in the circumferential recess around the second seat opening to align the second seat opening with the fluid passageway when the second end of the second body bushing is received into the circumferential recess around the second seat opening, and wherein the first side of the second seat is flat.

In some embodiments, the kit may include a gate having first and second ends, first and second opposing flat sides extending from the first end to the second end, a gate opening that extends through a first region of the gate, and a sealing surface formed by a second region of the gate. When the gate is installed into the valve chamber between the first and second seats, the first flat side of the gate slidingly engages the first flat side of the first seat and the second flat side of the gate slidingly engages the first flat side of the second seat. Furthermore, when the gate is installed into the valve chamber between the first and second seats, the gate is axially moveable within the valve chamber between an open position where the gate opening is aligned with the first and second seat openings and a closed position where the sealing surface of the gate is aligned with the first and second seat openings to close off the fluid passageway and the gate opening is aligned with the first and second sealing surfaces to close off both sides of the gate opening.

In some embodiments, the kit may be used to retrofit an existing gate valve, whether or not the existing gate valve has already been in service. The valve chamber of the existing gate valve may be accessed, such as by detaching one or more bonnets of the existing gate valve, then removing the gate and other internal components. Subsequently, first and second body bushings may be positioned to engage the respective first and second seat pockets, first and second seats may be positioned to engage the respective first and second body bushings, and the gate may be positioned between the first and second seats. The gate may be the same gate that was removed from the existing gate valve, or the gate may be a new gate that is optionally included in the kit.

In some embodiments, the gate valve is designed for a 5 inch to 7 inch fluid passageway. The kit for a gate valve of these sizes may include two (2) seats, two (2) body bushings, two (2) outer seal rings (i.e., larger diameter O-rings), two (2) inner seal rings (i.e., smaller diameter O-rings), and four (4) sections of a rubber cord. In other embodiments, the gate valve is designed for a 3 inch to 4 inch fluid passageway. The kit for a gate valve of these sizes may include two (2) integrated seats (i.e., the seat and body bushing is integrated into a single component referred to as an "integrated seat"), one (1) outer seal ring (i.e., larger diameter O-ring), one (1) inner seal ring (i.e., smaller diameter O-ring), and four (4) elastomeric cords.

Some embodiments provide the technical advantage of completely isolating the fluid media that is inside the fluid passageway, which may contain abrasive and/or corrosive materials, from escaping the intended flow path and entering the valve chamber.

FIG. 1 is a perspective view of a gate valve 10. Beginning from the top, the gate valve 10 includes a handwheel 12 for manually actuating the valve. A ball screw nut 14 is secured to a stem connection assembly 16 having a ball screw and upper valve stem therein and to the bearing seat 18 having a stem bearing therein. The first (upper) bonnet 20 is bolted to the valve body 30 and secures the bearing seat 18, connection assembly 16, ball screw nut 14 and handwheel 12 to the valve body 30 along the central axis 22 of the valve chamber (not shown) within the valve body 30.

The valve body 30 also includes a fluid passageway 40 that extends through the valve body 30 along the axis 42. Accordingly, the fluid passageway 40 extends between the pipe flanges 44, 46 and intersects the valve chamber (not shown) in the center of the valve body 30. A second (lower) bonnet 24 is bolted to the valve body 30 and secures a casing 26 about a packing gland and a balancing stem (not shown).

Figure 2:
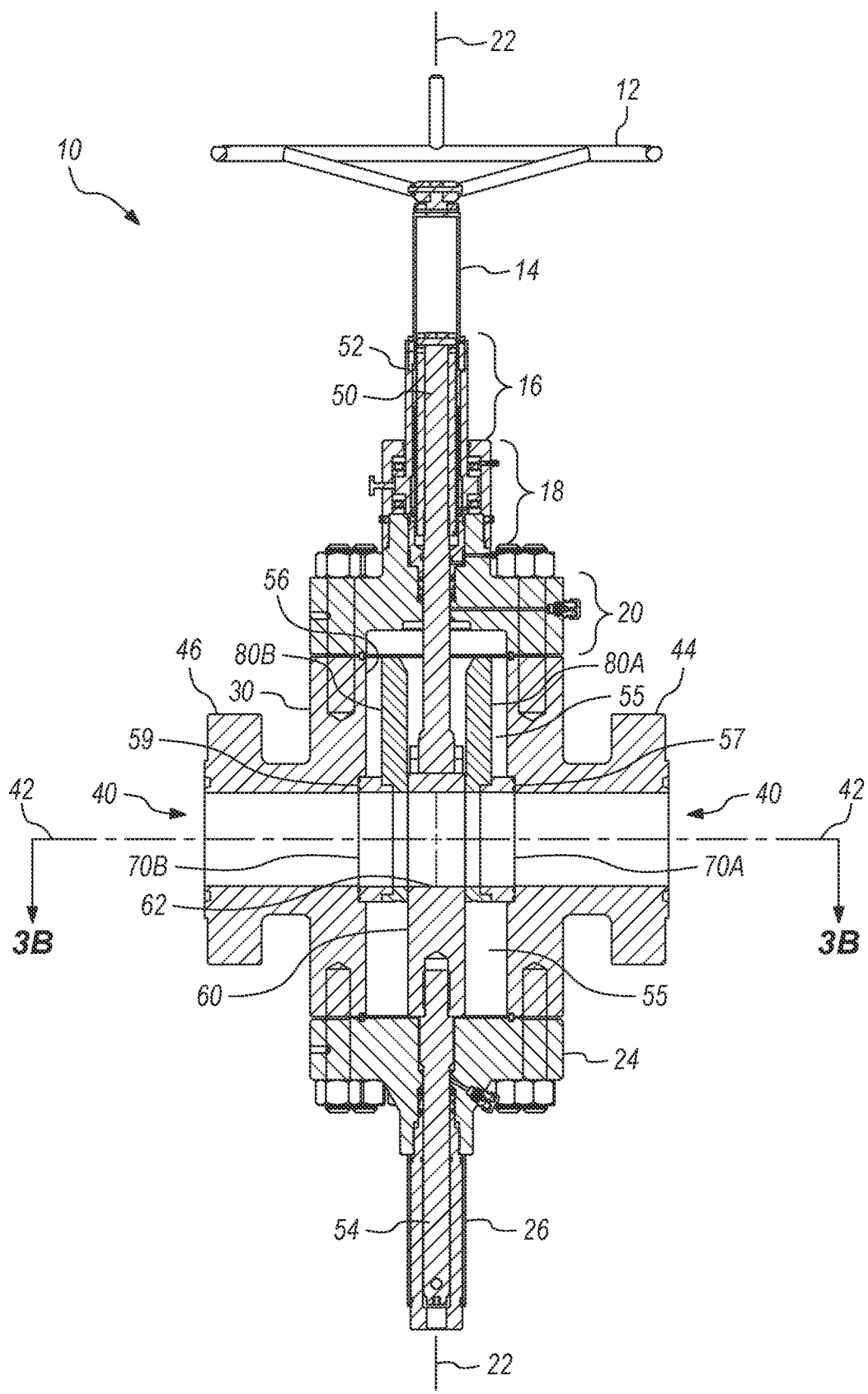
FIG. 2 is a cross-sectional side view of the gate valve.

FIG. 2 is a cross-sectional side view of the gate valve 10. In addition to showing the components described in reference to FIG. 1, FIG. 2 shows a number of components that are internal to the valve body 30. Specifically, the gate valve 10 includes a valve chamber 55, which may define a cylindrical interior wall 56 and first and second circumferential seat pockets 57. The valve chamber 55 intersects the fluid passageway 40, preferably with the central axis 22 of the valve chamber 55 intersecting the central axis 42 of the fluid passageway 40.

The valve stem 50 is coupled to ball screw 52 that engages the ball screw nut 14, such that rotation of the handwheel 12 causes rotation of the ball screw nut 14, which in turn raises or lowers the valve stem 50. The lower end of the valve stem 50 is coupled to the first (top) end of the gate 60. Conversely, an upper end of the balancing stem 54 is coupled to the second (bottom) end of the gate 60, wherein the balancing stem 54 extends into the casing 26. It should be recognized that the valve stem 50, the gate 60 and the balancing stem 54 move together axially along axis 22. As shown, the gate 60 is in an open position due to the alignment of the gate opening 62 with the axis 42 of the fluid passageway 40.

The first and second seat pockets 57, 59 are recesses that extend about the axis 42 and provide a flat circumferential surface around the fluid passageway 40. A first body bushing 70A is received in the first seat pocket 57 and extends in a first (leftward) direction into the valve chamber 55. Similarly, a second body bushing 70B is received in the second seat pocket 59 and extends in a second (rightward) direction into the valve chamber 55.

A first seat 80A has a first (lower) end with a seat opening having a rim that engages the first body bushing 70A and a second (upper) end with a sealing surface. Similarly, a second seat 80B has a first (lower) end with a seat opening having a rim that engages the second body bushing 70B. Under axial forces applied via the valve stem 50, the gate 60 may be moved axially (up and down as shown in FIG. 2) between the flat sealing surfaces of the first and second seats 80A, 80B. The relationships between the gate 60, seats 80A, 80B, body bushings 70A, 70B, valve chamber 55 and fluid passageway 40 will be shown in additional figures below.

Figure 3A:
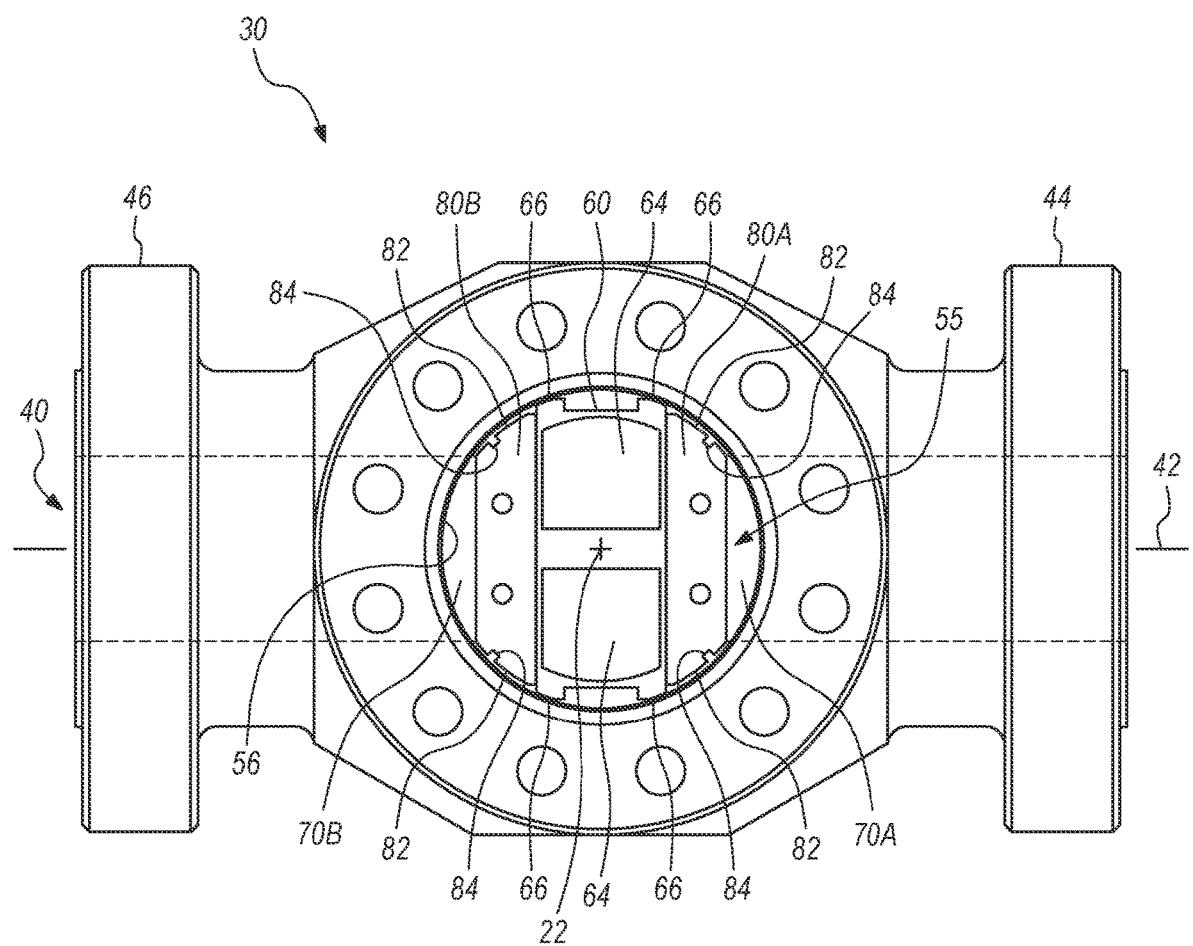
FIGS. 3A-B are top and cross-sectional views of a subassembly including the valve body, gate, first and second seats, and first and second body bushings.
Figure 3B:
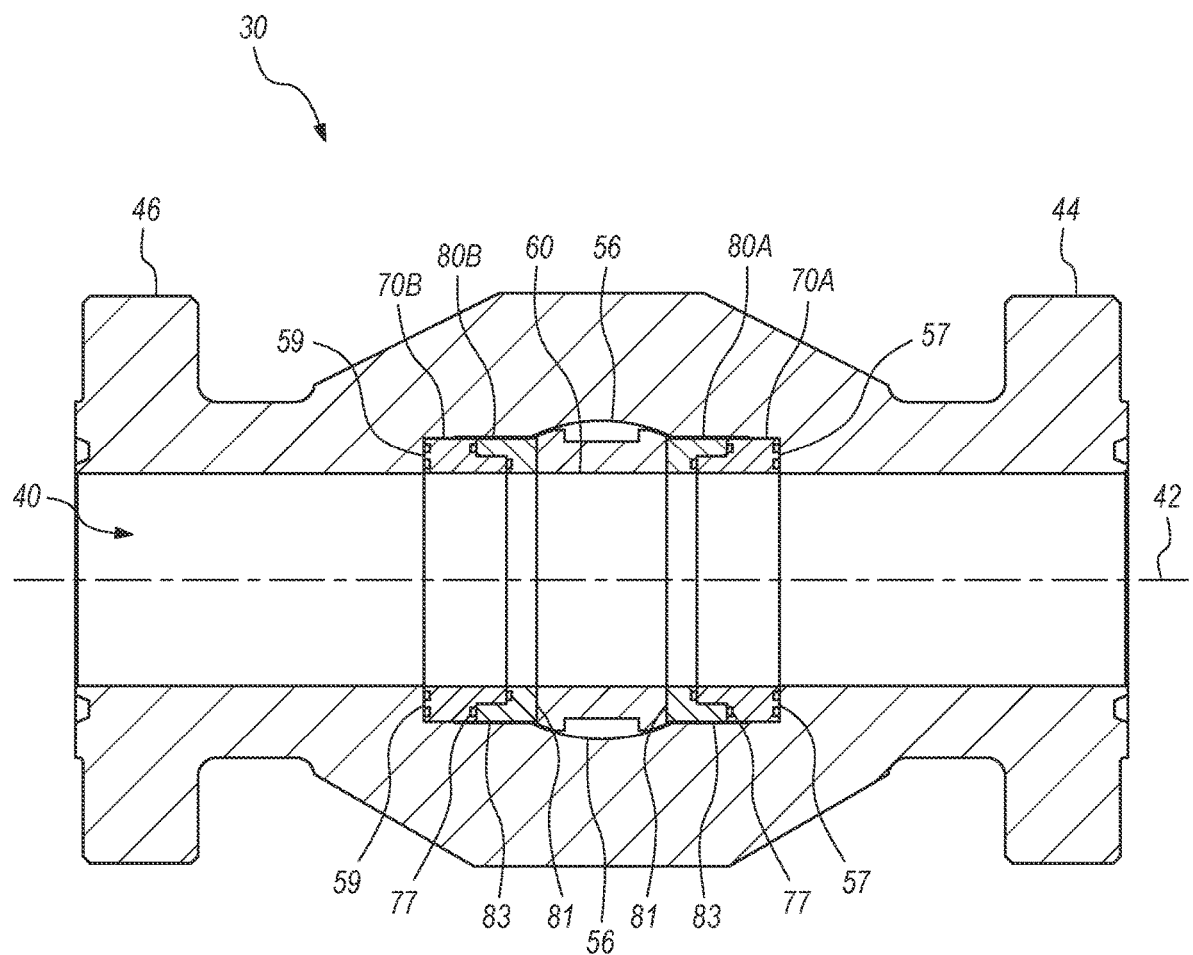

FIGS. 3A-B are top and cross-sectional views of a subassembly including the valve body, gate, first and second seats, and first and second body bushings. The top view of the sub-assembly in FIG. 3A illustrates the valve body 30, gate 60, first and second seats 80A, 80B, and first and second body bushings 70A, 70B. The lateral edges 82 of the first and second seats 80A, 80B are curved about the central axis 22 to follow the curvature of the interior wall 56. Each lateral edge 82 includes a groove 84 that receives an elastomeric cord (not shown). The elastomeric cord presses against the interior wall 56 and the respective groove 82 to push the scaling region of the respective seat 80A, 80B inward toward the gate 60. Specifically, when the gate 60 is in the closed position (see FIGS. 4B and 8B), the sealing regions of both seats 80A, 80B will be pushed against the opposing sides of the gate opening 62 (not shown; see FIG. 2). However, the flat sides of the gate 60 are able to slide between the flat sides of the seats 80A, 80B.

The gate 60 has a pair of stem connectors 64 that are adapted to couple with a first (lower) end of the valve stem 50 (now shown; see FIG. 2). In addition, the gate 60 may have guides 66 (four shown) along the opposing lateral edges of the gate 60. The guides 66 may help keep the gate 60 centered within the valve chamber 55.

FIG. 3B is a cross-sectional view of the subassembly taken along line 3B-3B in FIG. 2 where the gate is in the open position. Accordingly, the central axis of the gate 60 is aligned with the central axis 42 of the fluid passageway 40, the first body bushing 70A, the first seat 80A, the second body bushing 70B, and the second seat 80B. The first body bushing 70A has a first end abutting the shoulder in the first seat pocket 57 and the second body bushing 70B has a first end abutting the should in the second seat pocket 59. A first flat side 81 of the first seat 80A slidably engages the first (right-hand) side of the gate 60 and a rim 83 (see also FIGS. 6A-B) of the first seat 80A engages a circumferential recess or shoulder 77 of the first body bushing 70A. Similarly, a first flat side 81 of the second seat 80B slidably engages the second (left-hand) side of the gate 60 and a rim 83 (see also FIGS. 6A-B) of the second seat 80B engages a circumferential recess or shoulder 77 of the second body bushing 70B. Although the first and second seats 80A, 80B axially engage the first and second body bushings 70A, 70B, respectively, and do not contact the shoulders in the first and second seat pockets 57, 59 in this illustration, the first and second seats 80A, 80B are radially received within the first and second seat pockets 57, 59 such that the first region of each seat, which includes the seat openings, may receive some lateral support from the seat pockets (i.e., the cylindrical, inward-facing surfaces of the seat pockets).

In one option, the first body bushing 70A and first seat 80A may be integrated into a single component and the second body bushing 70B and second seat 80B may be integrated into a single component. The physical configuration of the body bushing and seats would be the same as illustration throughout the Figures, except that there would be no interface therebetween and no grooves or seal rings therebetween. This would reduce the part count. In newly constructed gate valves, the axial distance between the seat pockets could be reduced so that the integrated seats are not required to extend so far into the seat pockets.

Figure 4A:
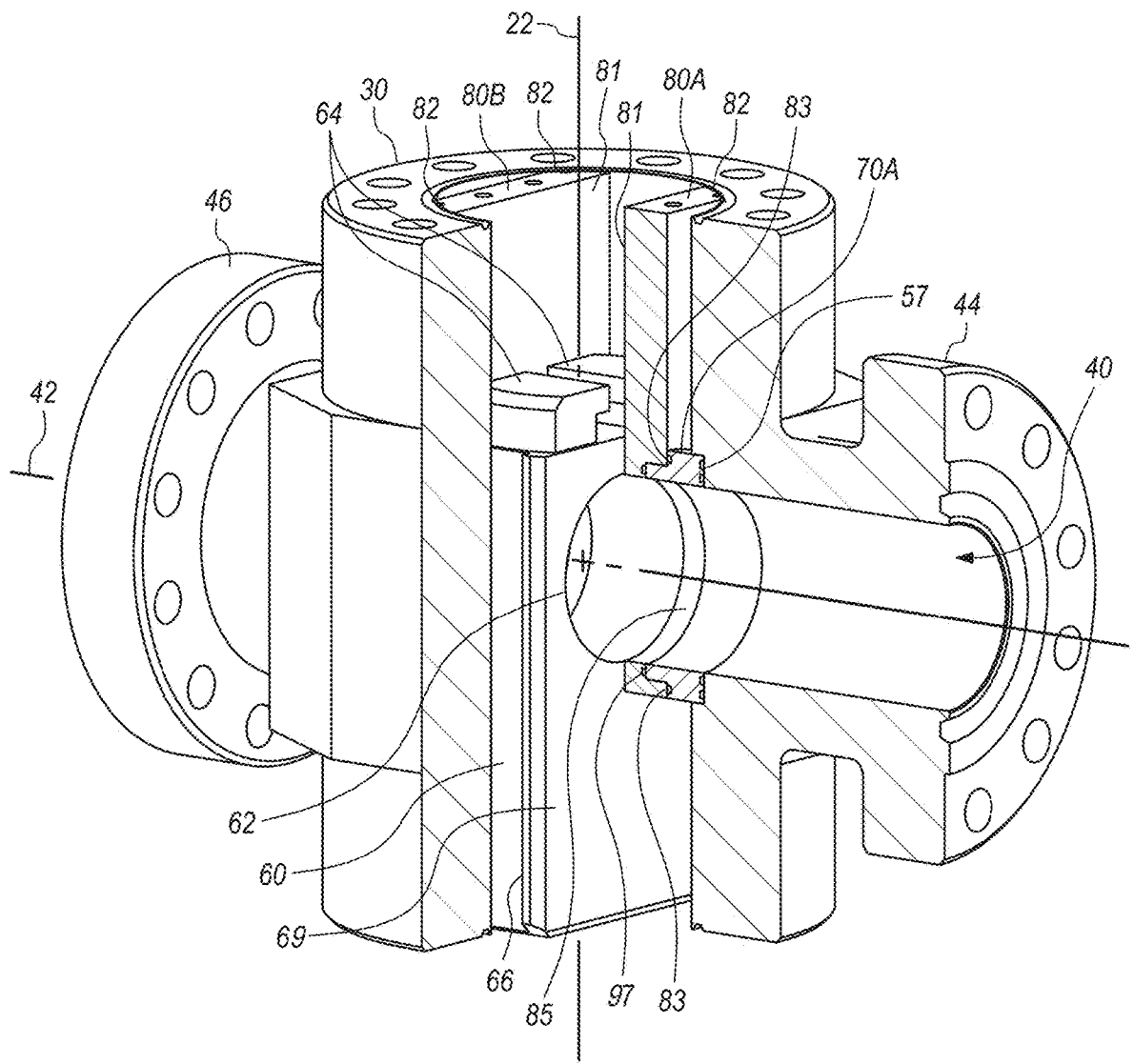
FIGS. 4A-B are cut-away views of the valve body showing the relationship of a body bushing and a seat to the gate in both the open position and the closed position.
Figure 4B:
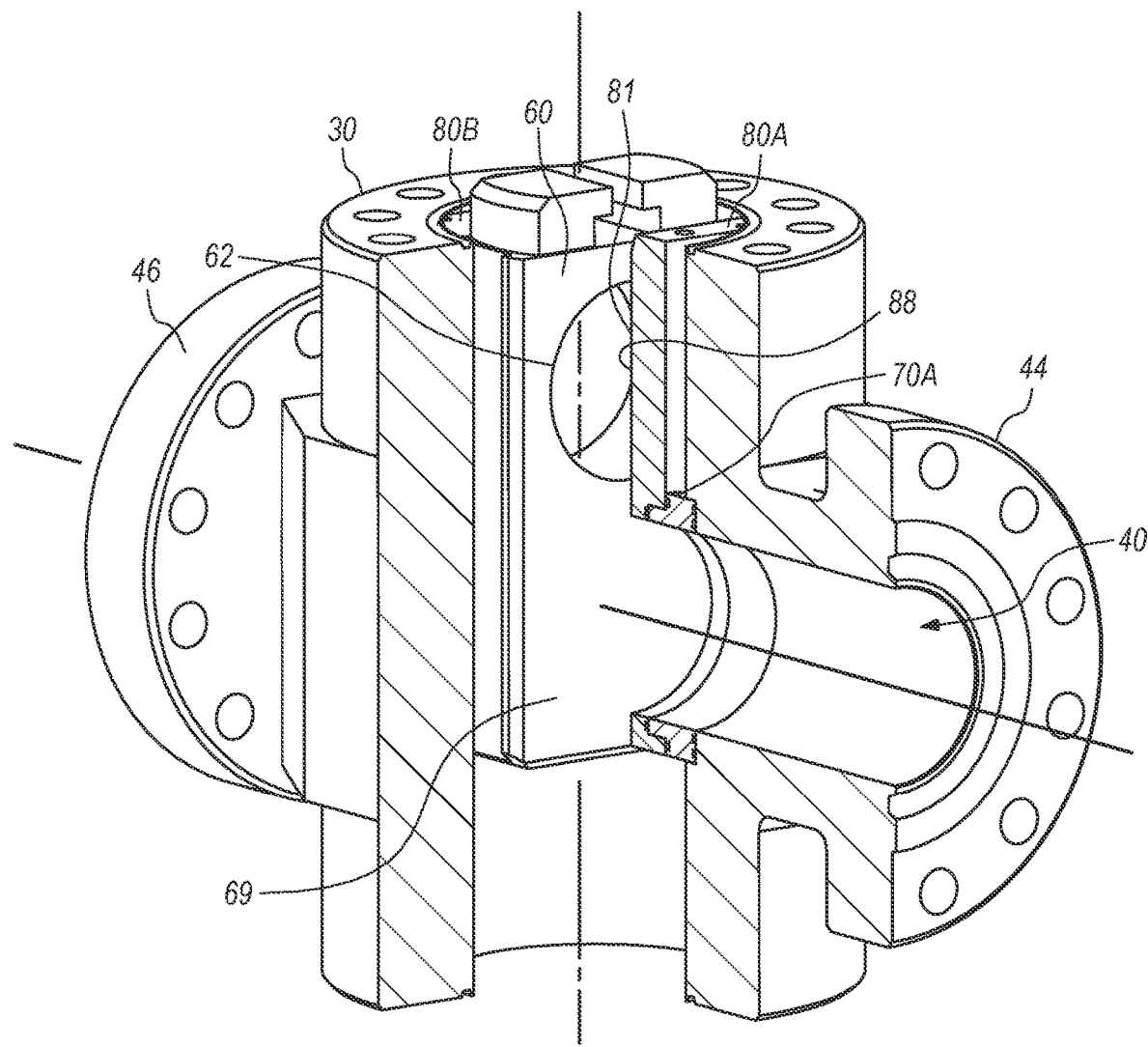

FIGS. 4A-B are cut-away views of the valve body 30 showing the relationship of a body bushing 70A and a seat 80A to the gate 60 in both the open position (see FIG. 4A) and the closed position (see FIG. 4B). FIG. 4A is a cut-away view of the valve body 30 showing the relationship of the first body bushing 70A and the first seat 80A to the gate 60. The first seat pocket 57 receives and supports a first end of the first body bushing 70A and causes a second end of the first body bushing 70A to extend in a first (inward, leftward) direction into the valve chamber 55. The first seat 80A includes a rim 83 around the seat opening 85 and a circumferential recess 97 that extends around the inside of the rim 83. The rim 83 and circumferential recess 97 of the first seat 80A form a complementary cross-sectional profile to the second end of the first body bushing 70A such that the first seat 80A is secured in alignment with the first body bushing 70A, which is secured in alignment with the fluid passageway 40 by the first seat pocket 57.

Note that the seat pockets 57, 59 (see also FIG. 2) as well as the body bushings 70A, 70B and seats 80A, 80B (see also FIG. 2) are symmetrical, such that the view of the first body bushing 70A and the first seat 80A shown in FIGS. 4A-B is representative of the second body bushing 70B and the second seat 80B if the valve body 30 was rotated 180 degrees about the central axis 22 of the valve chamber 55.

Accordingly, the first and second seats 80A, 80B each have a flat side 81 that is directed inward for sliding engagement against the flat sides of the gate 60. As shown, a gate opening 62 in the gate 60 is aligned with the fluid passageway 40 that is formed in the valve body 30 and with the openings in the first seat 80A and the first body bushing 70A. Accordingly, this illustrates the open position of the gate 60 within the valve body 30 (see also FIG. 8A).

FIG. 4B is a second cut-away view of the valve body 30 showing the relationship of the first body bushing 70A and the first seat 80A to the gate 60 when the gate 60 is in the closed position. In the closed position, the sealing surface 69 of the gate 60 is aligned with the seat openings in the first and second seats 80A, 80B to close off the fluid passageway 40 and the gate opening 62 is aligned with the sealing surface 88 of the first seat 80A and the sealing surface of the second seat 80B to close off both sides of the gate opening 62 (see also FIG. 8B).

Figure 5A:
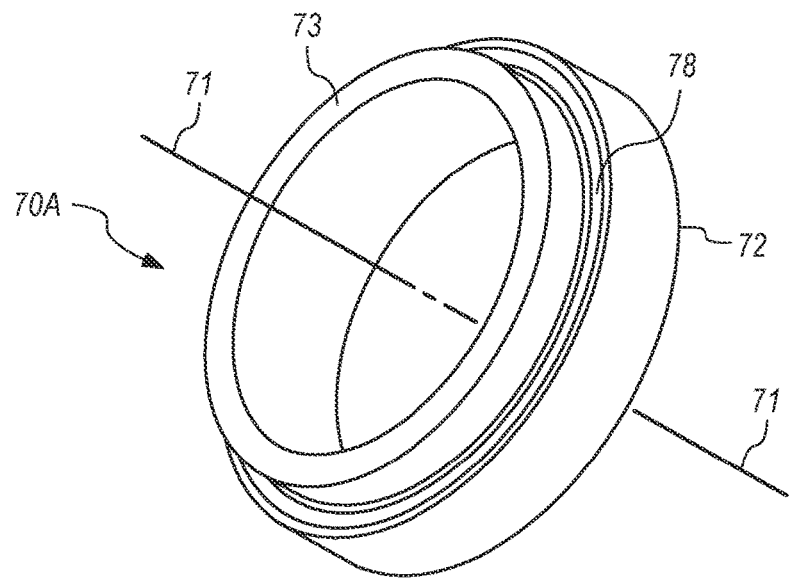
FIGS. 5A-B are perspective and cross-sectional views of a body bushing.
Figure 5B:
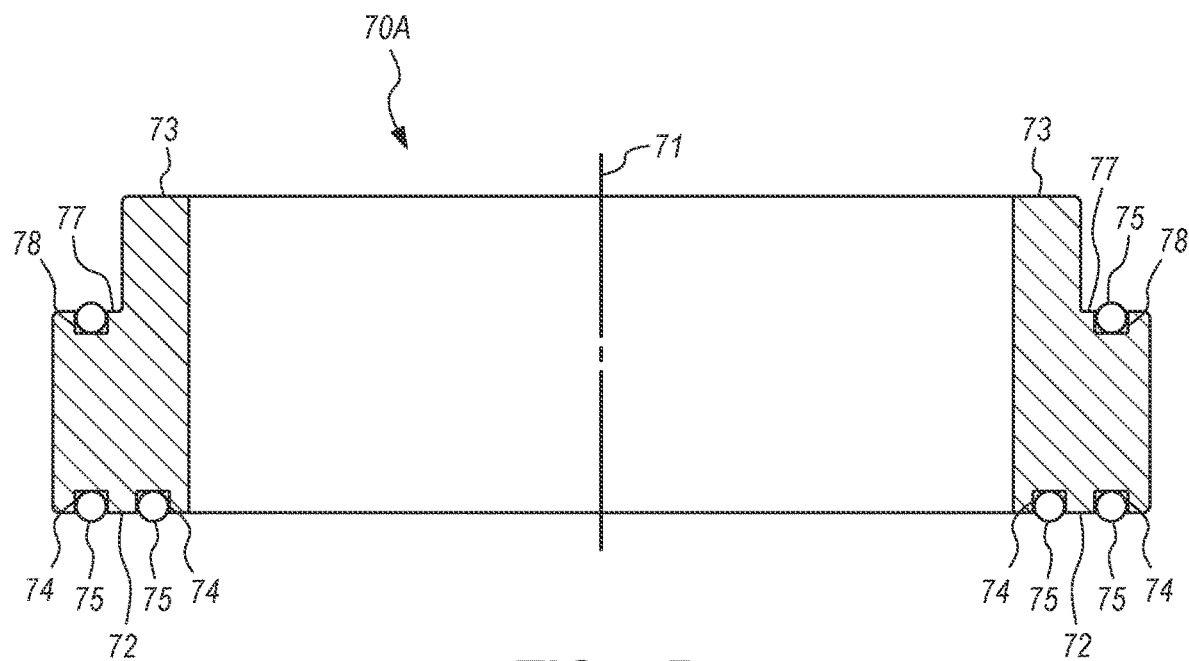

FIGS. 5A-B are perspective and cross-sectional views of the first body bushing 70A, which is representative of, or identical to, the second body bushing 70B (not shown; see FIG. 2). In reference to FIG. 5A, the first body bushing 70A is shown to be generally circular with a radius and a uniform cross-sectional profile about a central axis 71. In the axial direction, the first body bushing 70A has a first end 72 and a second end 73. In reference to FIG. 5B, the cross-sectional profile of the first body bushing 70A is shown. The first end 72 includes a pair of circumferential grooves 74 for receiving the seal rings 75 will engage and seal with the seat pocket 57 (not shown; see FIGS. 2 and 4). The second end 73 includes the circumferential recess or shoulder 77 with the circumferential groove 78 for receiving a seal ring 75.

Figure 6A:
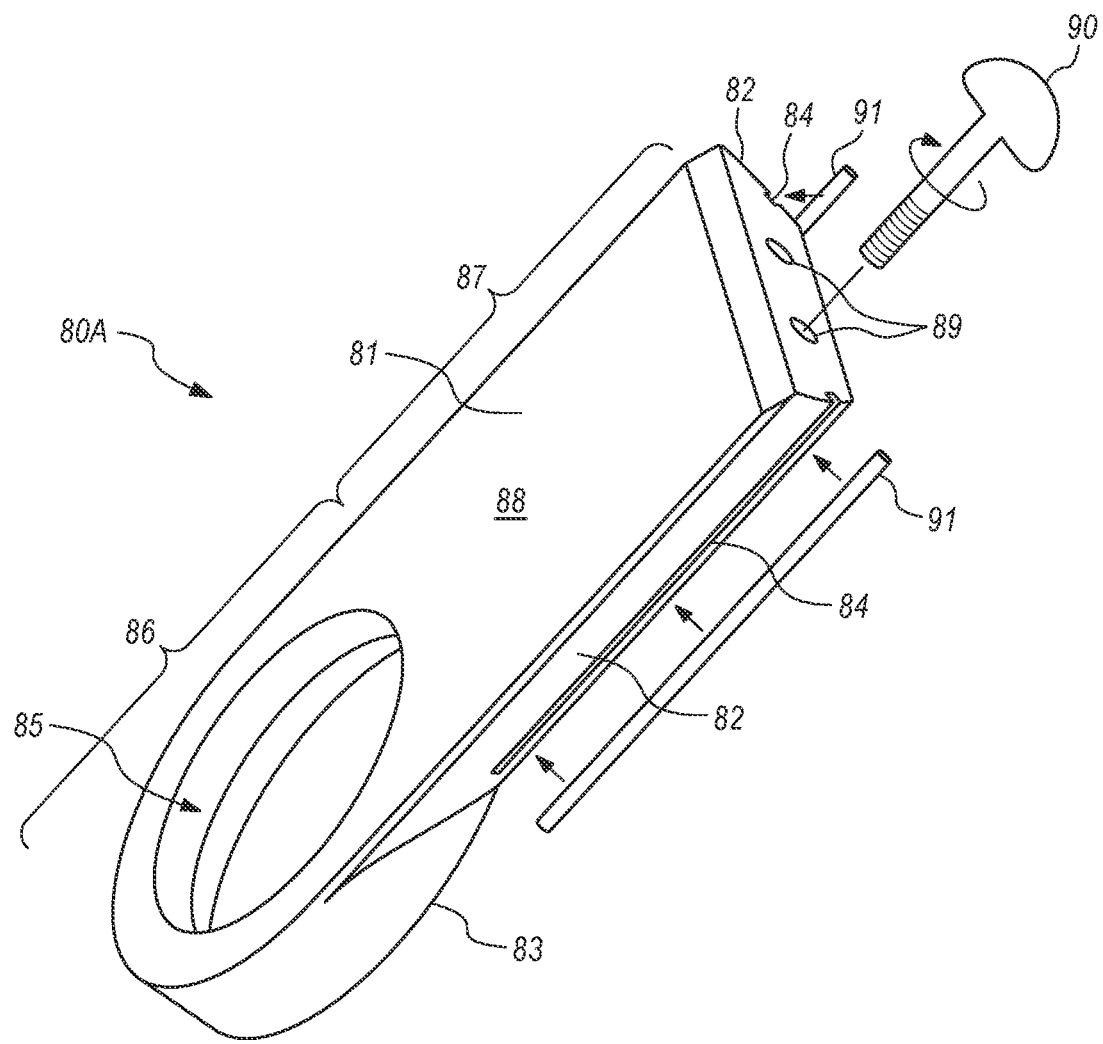
FIGS. 6A-B are front and back perspective views of a seat.
Figure 6B:
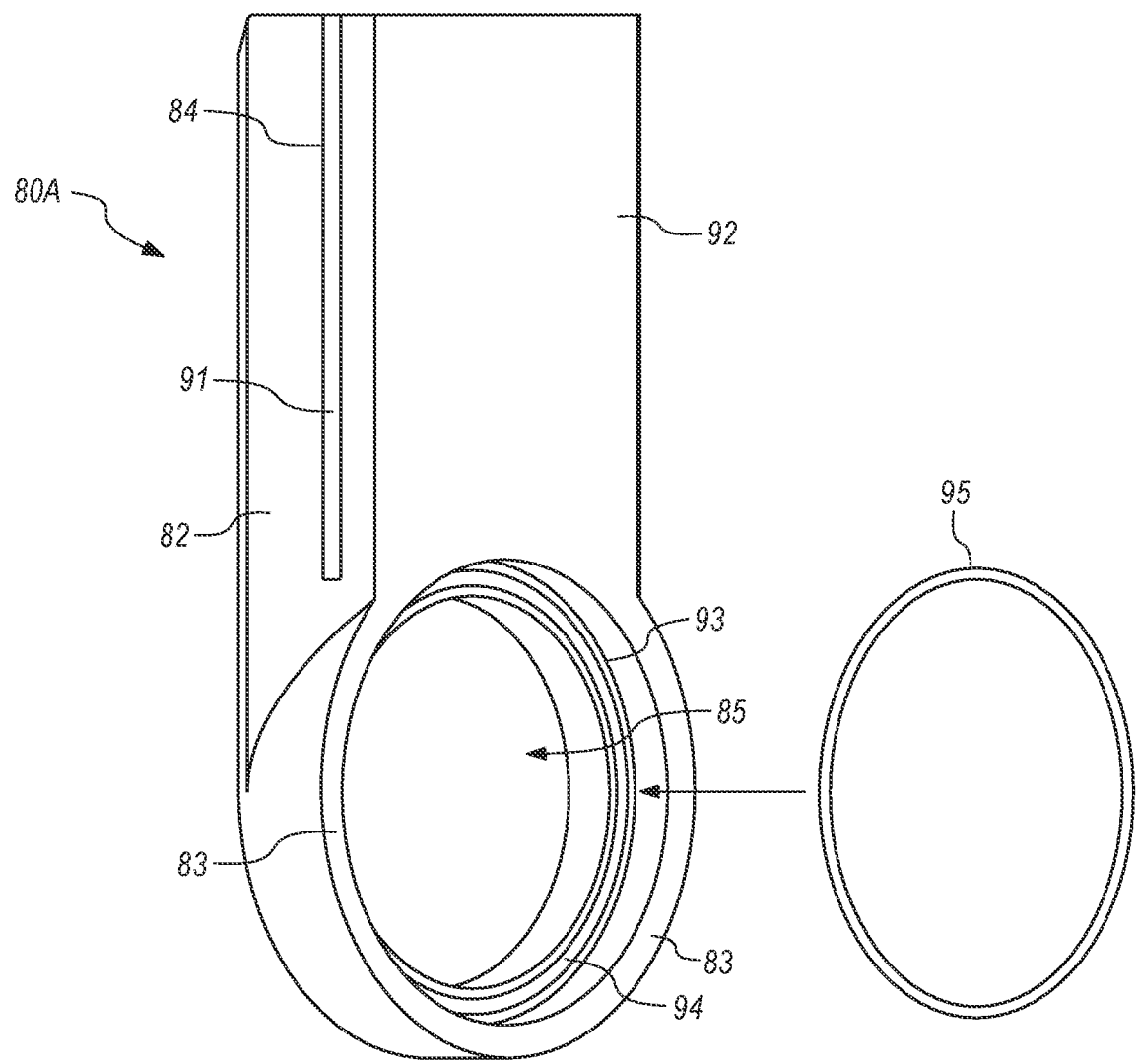

FIGS. 6A-B are front and back perspective views of the first seat 80A. FIG. 6A shows the flat first side 81 of the first seat 80A having a first region 86 that includes the seat opening 85 and a second region 87 having a sealing surface 88. The second end of the first seat 80A includes a pair of optional threaded blind holes 89 for temporarily securing a threaded tool 90. The threaded tool 90 may be helpful for controllably manipulating the first seat 80A into position within the valve chamber.

In both FIGS. 6A-B, the lateral edges 82 are shown each having a groove 84 for receiving an elastomeric cord 91 (only one shown). As previously described, the elastomeric cords 91 engage the interior wall 56 of the valve chamber 55 (not shown; see FIG. 3) to push or bias the seat 80A toward the gate 60 (not shown; see FIGS. 3 and 4) so that the sealing surface 88 will firmly contact the gate opening 62 (not shown; see FIGS. 2 and 4) when the gate is in the closed position.

FIG. 6B shows the second side 92 of the first seat 80A. The second side 92 forms the rim 83 around the seat opening 85. The seat opening 85 includes a circumferential recess or shoulder 93 that faces in the second (outward, rightward) direction toward the first body bushing 80A (not shown; see FIGS. 2-4). A circumferential groove 94 extends around the recess 93 to receive a seal ring 95. Note that any of the seal rings or elastomeric cords described herein may have a cross-sectional profile that is circular, rectangular or other suitable shape.

Figure 7A:
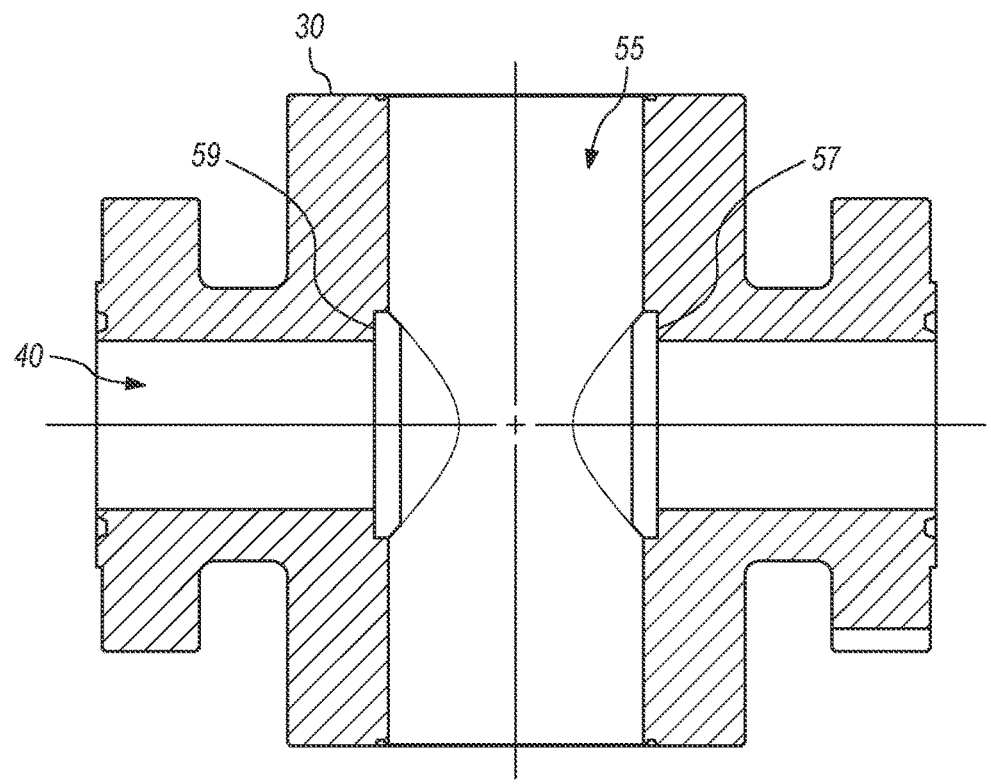
FIGS. 7A-D are cross-sectional side views of the valve body illustrating the sequential installation of the first and second body bushings, first and second seats and the gate.

FIGS. 7A-D are cross-sectional side views of the valve body 30 illustrating the sequential installation of the first and second body bushings, first and second seats and the gate. In FIG. 7A, the valve body 30 is illustrated to show fluid passageway 40, the valve chamber 55, and the first and second seat pockets 57, 59. Accordingly, the valve body 30 is essentially empty and ready for installation of the first and second body bushings, first and second seats and the gate, which may be provided in a kit of components.

Figure 7B:
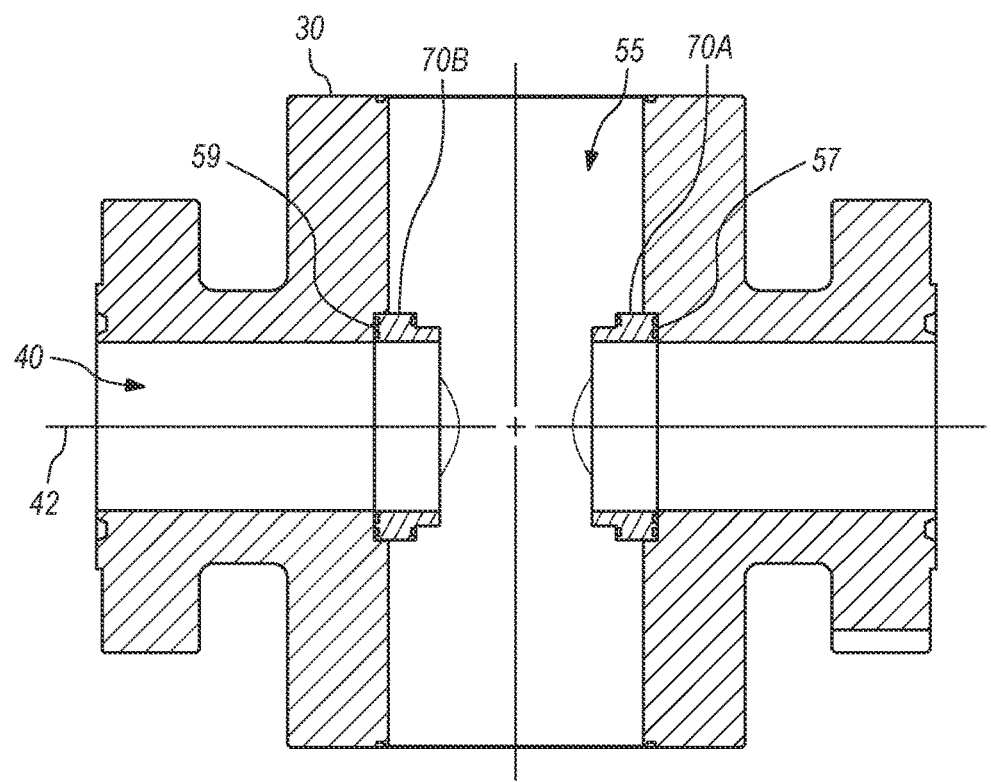

In FIG. 7B, the first and second body bushings 70A, 70B have been positioned in the valve chamber 55 around the fluid passageway 40. Specifically, the first body bushing 70A is received in the first seat pocket 57 and the second body bushing 70B is received in the second seat pocket 59 on opposite sides of the valve chamber 55. As shown, the central axis of the first and second body bushings 70A, 70B is aligned with the central axis 42 of the fluid passageway 40.

Figure 7C:
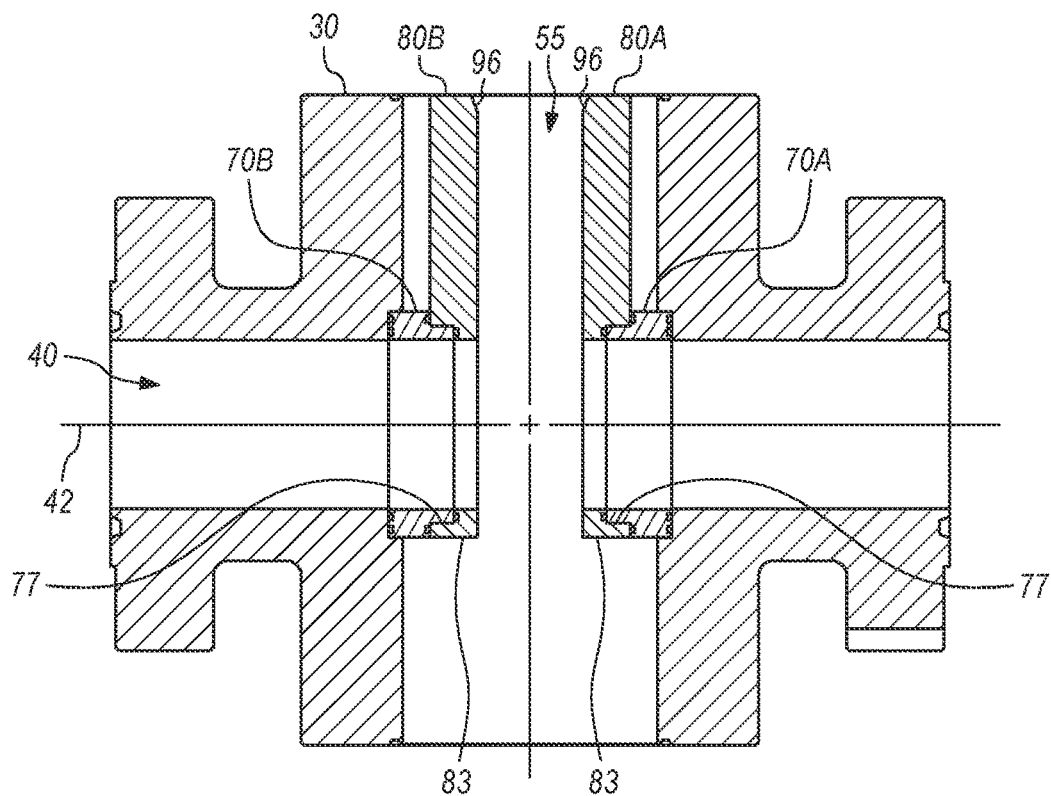

In FIG. 7C, the first and second seats 80A, 80B have been positioned in the valve chamber 55 and engaged with the first and second body bushings 70A, 70B. Specifically, the rim 83 around the seat opening in the first seat 80A engages the circumferential recess 77 in the first body bushing 70A and the rim 83 around the seat opening in the second seat 80B engages the circumferential recess 77 in the second body bushing 70B.

Figure 7D:
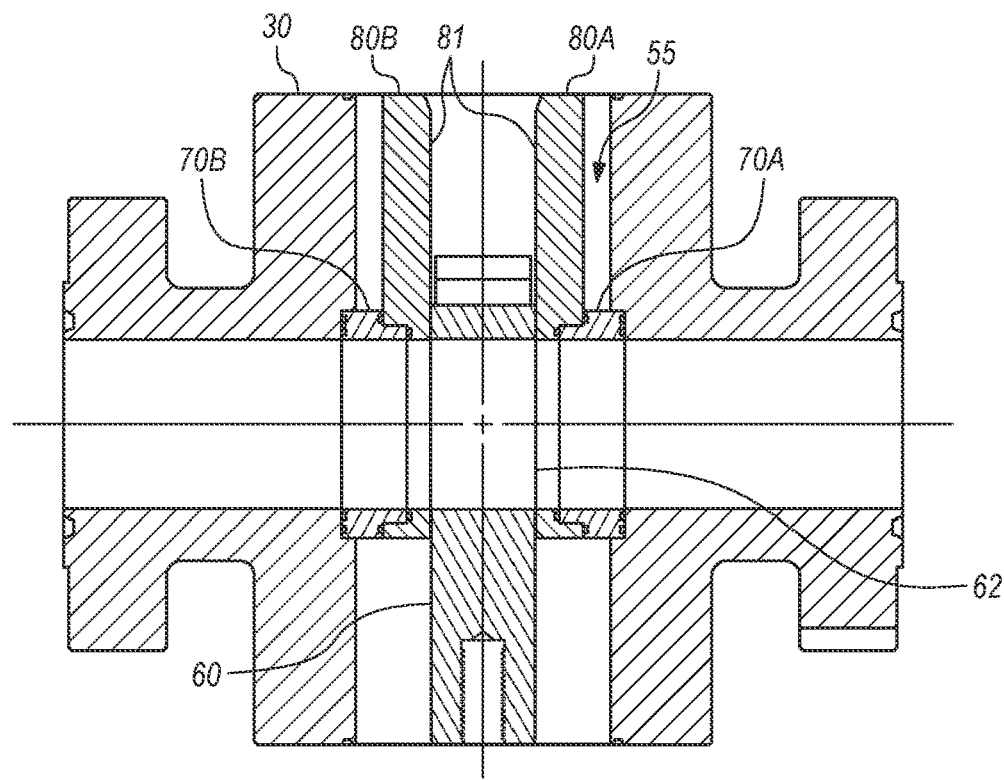

In FIG. 7D, the gate 60 has now been positioned in the valve chamber 55 between the opposing first surfaces 81 of the first and second seats 80A, 80B. The insertion of the gate 60 may be facilitated by a bevel 96 at the top edge of the first (inner) side of each seat 80A, 80B. The gate 60 has smooth and flat sides that are in slidable face-to-face contact with the smooth and flat first (inner) sides of the first and second seats 80A, 80B.

To be operational, the gate 60 should be connected to the valve stem 50 (see FIG. 2) and the optional balancing stem 54 (see FIG. 2), and the first and second bonnets 20, 24 with associated components should be secured to the valve body 30 (see FIG. 2). During use in a system for controlling fluid flow, the valve body 30 will be further connected to pipes as shown in FIGS. 8A-B.

Figure 8A:
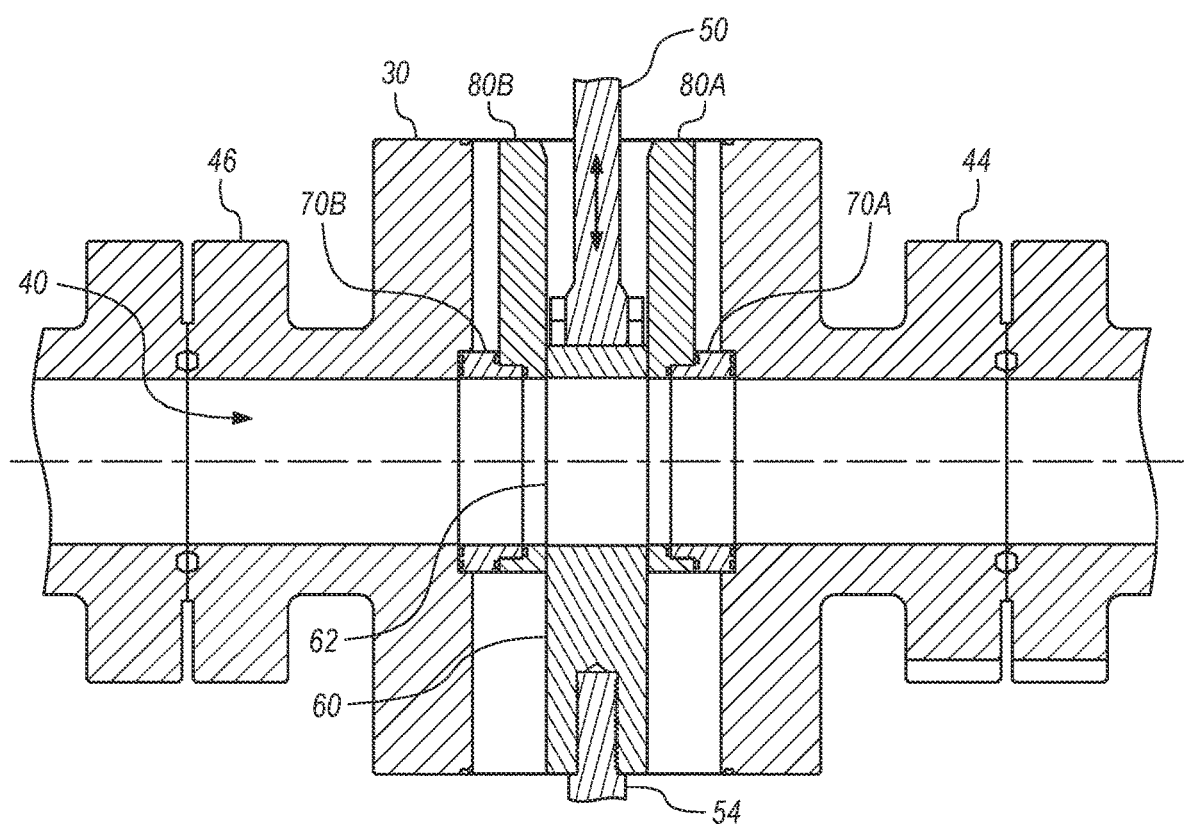
FIGS. 8A-B are cross-sectional side views illustrating the gate in the open position and the closed position, respectively.
Figure 8B:
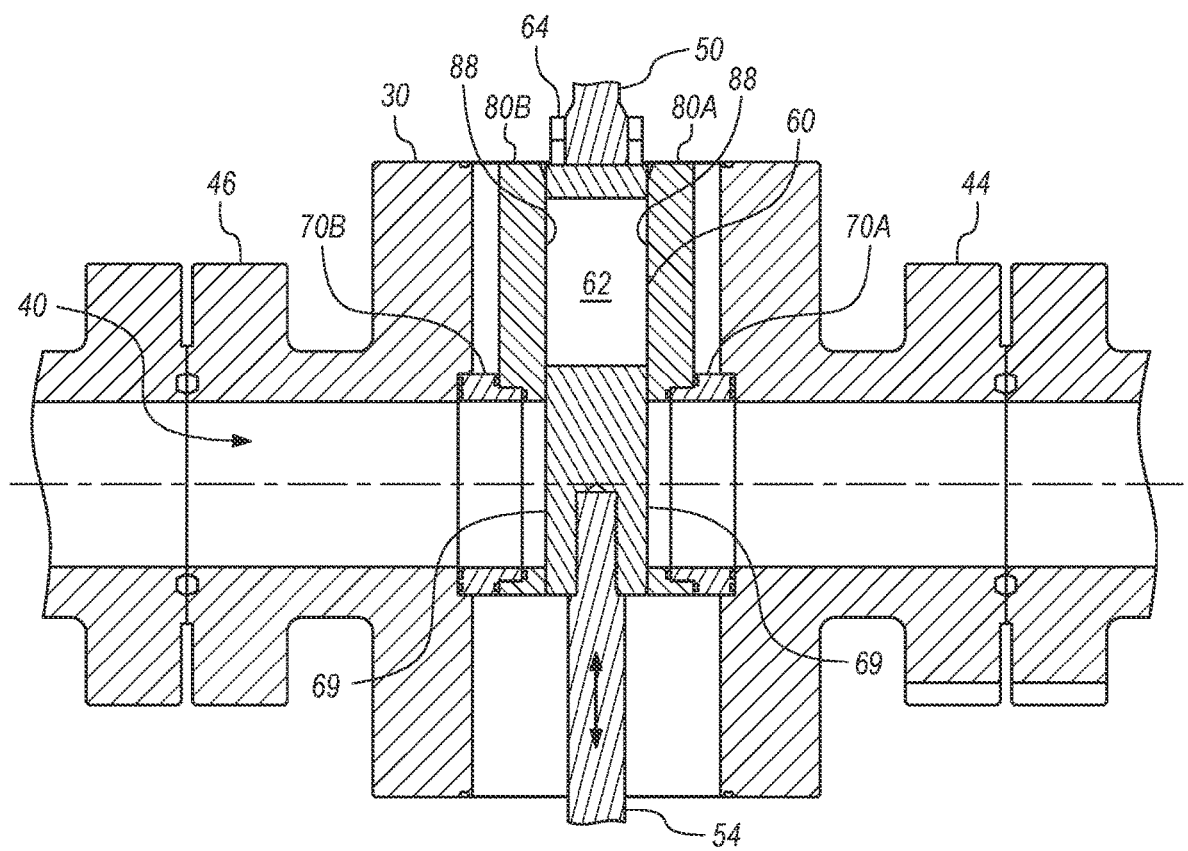

FIGS. 8A-B are cross-sectional side views illustrating the gate 60 in the open position (FIG. 8A) and the closed position (FIG. 8B), respectively. In FIG. 8A, the gate opening 62 is axially aligned with the openings in the first and second seats 80A, 80B, the first and second body bushings 70A, 70B, and the fluid passageway 40. In FIG. 8B, the gate 60 has been moved upward by forces connected to the valve stem 50 so that the sealing surfaces 69 of the gate 60 are aligned with the openings in the first and second seats 80A, 80B to close off the fluid passageway 40. Furthermore, the gate opening 62 is aligned with the sealing surfaces 88 of the first and second seats 80A, 80B to close off both sides of the gate opening 62. Any fluid that was in the gate opening 62 when the gate opening was closed off from the fluid passageway 40 will remain in the gate opening 62 between the sealing surfaces 88 until the gate 60 is returned to the open position.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A gate valve, comprising:
   a valve body forming a valve chamber within the valve body and forming a fluid passageway that extends through the valve body and transversely intersecting the valve chamber, wherein the valve chamber includes a first circumferential seat pocket around the fluid passageway facing into the valve chamber in a first direction and a second circumferential seat pocket around the fluid passageway facing into the valve chamber in a second direction opposite the first direction;
   a first body bushing having a first end received in the first circumferential seat pocket, a second end extending in the first direction into the valve chamber, and an opening through the first body bushing that aligns with the fluid passageway;
   a second body bushing having a first end received in the second circumferential seat pocket and a second end extending in the second direction into the valve chamber, and an opening through the second body bushing that aligns with the fluid passageway;
   a first seat having first and second ends, first and second opposing sides extending between the first and second ends of the first seat, a first seat opening that extends through the first seat between the first and second opposing sides of the first seat in a first region of the first seat at the first end of the first seat, a first sealing surface formed by a second region of the first seat at the second end of the first seat, and a circumferential recess around the first seat opening on the second side of the first seat, wherein the second end of the first body bushing is received in the circumferential recess around the first seat opening to align the first seat opening with the fluid passageway, and wherein the first side of the first seat is flat;
   a second seat having first and second ends, first and second opposing sides extending between the first and second ends of the second seat, a second seat opening that extends through the second seat between the first and second opposing sides of the second seat in a first region of the second seat at the first end of the second seat, a second sealing surface formed by a second region of the second seat at the second end of the second seat, and a circumferential recess around the second seat opening on the second side of the second seat, wherein the second end of the second body bushing is received in the circumferential recess around the second seat opening to align the second seat opening with the fluid passageway, and wherein the first side of the second seat is flat; and
   a gate having first and second ends, first and second opposing flat sides extending from the first end to the second end, a gate opening that extends through the gate between the first and second opposing flat sides of the gate in a first region of the gate at the first end of the gate, and a sealing surface of the gate formed by a second region of the gate at the second end of the gate, wherein the first flat side of the gate slidingly engages the first flat side of the first seat and the second flat side of the gate slidingly engages the first flat side of the second seat, and wherein the gate is axially moveable within the valve chamber between an open position where the gate opening is aligned with the first and second seat openings and a closed position where the sealing surface of the gate is aligned with the first and second seat openings to close off the fluid passageway and the gate opening is aligned with the first sealing surface of the first seat and the second sealing surface of the second seat to close off both sides of the gate opening.

2. The gate valve of claim 1, wherein the first flat side of the first seat has no grooves or interfaces between the first region and the second region that would allow a fluid within the gate opening to escape into the valve chamber as the gate opening is axially moved between the open and closed positions.

3. The gate valve of claim 2, characterized in that the closed position of the gate prevents the fluid from flowing through the fluid passageway and retains fluid within the gate opening without injecting grease into the valve chamber.

4. The gate valve of claim 1, wherein the first region of the gate is closer to a valve stem than the second region of the gate, the first region of the first seat is more distant from the valve stem than the second region of the first seat, and the first region of the second seat is more distant from the valve stem than the second region of the second seat.

5. The gate valve of claim 1, wherein the first region of the gate is more distant from a valve stem than the second region of the gate, the first region of the first seat is closer to the valve stem than the second region of the first seat, and the first region of the second seat closer to the valve stem than the second region of the second seat.

6. The gate valve of claim 1, wherein the first seat has first and second lateral edges that engage an interior wall of the valve chamber, and wherein the second seat has first and second lateral edges that engage the interior wall of the valve chamber.

7. The gate valve of claim 6, wherein the interior wall of the valve chamber is cylindrical about a central axis and has a first radius of curvature, and wherein the first and second lateral edges of the first and second seats have a second radius of curvature that is up to ¼ inch less than the first radius of curvature.

8. The gate valve of claim 6, further comprising:
   a groove within the first and second lateral edges of the first and second seats; and an elastomeric cord disposed in the groove, wherein the elastomeric cord engages the interior wall of the valve chamber and pushes the first and second seats against the gate.

9. The gate valve of claim 8, wherein the gate includes first and second lateral edges that engage the interior wall of the valve chamber.

10. The gate valve of claim 1, further comprising:
one or more threaded blind holes in the first and/or second end of the first seat for temporary connection to a first tool for positioning the first seat into the valve chamber during assembly of the gate valve; and
one or more threaded blind holes in the first and/or second end of the second seat for temporary connection to a second tool for positioning the second seat into the valve chamber during assembly of the gate valve.

11. The gate valve of claim 1, further comprising:
a first circumferential rim around the first seat opening on the second side of the first seat, wherein at least a portion of the first circumferential rim extends into the first circumferential seat pocket around the fluid passageway; and
a second circumferential rim around the second seat opening on the second side of the second seat, wherein at least a portion of the second circumferential rim extends into the second circumferential seat pocket around the fluid passageway.

12. The gate valve of claim 11, further comprising:
a first circumferential groove formed in the circumferential recess around the first seat opening;
a first seal ring disposed in the first circumferential groove, wherein the first seal ring engages and seals with the second end of the first body bushing;
a second circumferential groove formed in a circumferential recess around the second end of the first body bushing; and
a second seal ring disposed in the second circumferential groove, wherein the second seal ring engages and seals with the first circumferential rim around the first seat opening, wherein the first circumferential groove and the first seal ring each have a first diameter and the second circumferential groove and the second seal ring each have a second diameter that is greater than the first diameter.

13. The gate valve of claim 12, further comprising:
third and fourth circumferential grooves formed in the first end of the first body bushing; and
a third seal ring disposed in the third circumferential groove and a fourth seal ring disposed in the fourth circumferential groove, wherein the third and fourth seal rings engage and seal with the first circumferential seat pocket around the fluid passageway, wherein the third circumferential groove and the third seal ring each have a third diameter and the fourth circumferential groove and the fourth seal ring each have a fourth diameter that is greater than the third diameter.

14. The gate valve of claim 1, further comprising:
a first bonnet secured to the valve body in axial alignment with the valve chamber;
a valve stem having a first end coupled to the first end of the gate and axially extending through the first bonnet to a second end of the valve stem;
an actuator coupled to the second end of the valve stem for moving the gate between the open and closed positions.

15. The gate valve of claim 14, wherein the valve stem includes a section with screw threads, and wherein the first bonnet includes a ball screw nut engaged with the screw threads.

16. The gate valve of claim 14, further comprising:
a second bonnet secured the valve body in axial alignment with the valve chamber, wherein the second bonnet is secured on an opposite side of the valve chamber from the first bonnet; and
a balancing stem having a first end coupled to the second end of the gate and axially extending into the second bonnet to a second end of the balancing stem.

17. The gate valve of claim 16, further comprising:
a valve stem bearing disposed in the first bonnet and around the valve stem for supporting axial movement of the valve stem; and
a balancing stem bearing disposed in the second bonnet and around the balancing stem for supporting axial movement of the balancing stem.

18. The gate valve of claim 1, wherein the fluid passageway has a nominal diameter from 5 inches to 9 inches.

19. A kit for modifying a gate valve having a valve body that forms a valve chamber within the valve body and forms a fluid passageway that extends through the valve body and transversely intersects the valve chamber, wherein the valve chamber includes a first circumferential seat pocket around the fluid passageway facing into the valve chamber in a first direction and a second circumferential seat pocket around the fluid passageway facing into the valve chamber in a second direction opposite the first direction, the kit comprising:
a first body bushing having a first end that is receivable in the first circumferential seat pocket, a second end that extends in the first direction into the valve chamber when the first end of the first body bushing is received into the first circumferential seat pocket, and an opening through the first body bushing that aligns with the fluid passageway when the first end of the first body bushing is received into the first circumferential seat pocket;
a second body bushing having a first end that is receivable in the second circumferential seat pocket, a second end that extends in the second direction into the valve chamber when the first end of the second body bushing is received into the second circumferential seat pocket, and an opening through the second body bushing that aligns with the fluid passageway when the first end of the second body bushing is received into the first circumferential seat pocket;
a first seat having first and second ends, first and second opposing sides extending between the first and second ends of the first seat, a first seat opening that extends through a first region of the first seat between the first and second opposing sides of the first seat in a first region of the first seat at the first end of the first seat, a first sealing surface formed by a second region of the first seat at the second end of the first seat, and a circumferential recess around the first seat opening on the second side of the first seat, wherein the second end of the first body bushing is receivable in the circumferential recess around the first seat opening to align the first seat opening with the fluid passageway when the second end of the first body bushing is received into the circumferential recess around the first seat opening, and wherein the first side of the first seat is flat; and
a second seat having first and second ends, first and second opposing sides extending between the first and second ends of the second seat, a second seat opening that extends through a first region of the second seat between the first and second opposing sides of the second seat in a first region of the second seat at the first end of the second seat, a second sealing surface formed by a second region of the second seat at the second end of the second seat, and a circumferential recess around the second seat opening on the second side of the second seat, wherein the second end of the second body bushing is receivable in the circumferential recess around the second seat opening to align the second seat opening with the fluid passageway when the second end of the second body bushing is received into the circumferential recess around the second seat opening, and wherein the first side of the second seat is flat.

20. The kit of claim 19, further comprising:
a gate having first and second ends, first and second opposing flat sides extending from the first end to the second end, a gate opening that extends through a first region of the gate between the first and second opposing flat sides of the gate in a first region of the gate at the first end of the gate, and a sealing surface formed by a second region of the gate at the second end of the gate, wherein, when the gate is installed into the valve chamber between the first and second seats, the first flat side of the gate slidingly engages the first flat side of the first seat and the second flat side of the gate slidingly engages the first flat side of the second seat, and wherein, when the gate is installed into the valve chamber between the first and second seats, the gate is axially moveable within the valve chamber between an open position where the gate opening is aligned with the first and second seat openings and a closed position where the sealing surface of the gate is aligned with the first and second seat openings to close off the fluid passageway and the gate opening is aligned with the first and second sealing surfaces to close off both sides of the gate opening.

\* \* \* \* \*